United States Patent [19]

Veldman

[11] 3,938,471

[45] Feb. 17, 1976

[54] BEDDING RETAINER WITH DRAINAGE FACILITY

[75] Inventor: Adrian Veldman, Embro, Canada

[73] Assignee: Wildwood Farm Services International Inc., St. Pauls, Canada

[22] Filed: Aug. 2, 1974

[21] Appl. No.: 494,183

[30] Foreign Application Priority Data
July 26, 1974  Canada .............................. 205752

[52] U.S. Cl. .................................................. 119/28
[51] Int. Cl.² ............................................ A01K 1/00
[58] Field of Search ............. 119/28, 16, 20, 21, 27

[56] References Cited
UNITED STATES PATENTS
2,665,664  1/1954  Benjamin .............................. 119/28

3,457,901  7/1969  Abraham .............................. 119/28

FOREIGN PATENTS OR APPLICATIONS
787,677  6/1968  Canada .............................. 119/28

Primary Examiner—J. N. Eskovitz
Attorney, Agent, or Firm—Finnegan, Henderson, Farabow & Garrett

[57] ABSTRACT

A bedding retainer to retain bedding in the stall for animals in a barn provides a passage through the retainer permitting fluids to drain from the stall through the retainer into the adjacent gutter for subsequent discharge.

8 Claims, 6 Drawing Figures

BEDDING RETAINER WITH DRAINAGE FACILITY

The present invention relates to a retainer for use in an animal stall to retain bedding within the confines of the stall, while at the same time, permitting drainage of urine and other liquids from the stall into the adjacent gutter for discharge.

It has become popular in husbandry, particularly in modern barns, to use a bedding retainer such as that disclosed in Canadian letters Pat. No. 787677 issued June 18, 1968 to William T. Langdon, to constrain straw and bedding from shifting out of the stall into the gutter where it is spoiled for future use.

It has been found that such bedding retainers are effective for such purposes as they effectively provide a barrier along the total length of the stall opening toward the gutter.

It has been further found, however, that if water is spilled within the stall, or if the animal urinates into the stall rather than the gutter, such bedding retainer provides an effective seal along the stall opening against the drainage of the liquids resident on the stall floor into the gutter. Pooling of these liquids in the stall results, causing wet and spoiled bedding.

In dairy farms certain health authorities in North America where prior art bedding retainers have gained acceptance, have now refused to permit their installation in barns and in some cases have requested their removal because the pooling of swirl and animal waste in the stall permits infection and disease to breed with vigor. Such environment is not conducive to healthy animal stock nor good quality milk production, for it is known that in exceptional circumstances the milk from cows itself can become contaminated and become also a carrier of disease and bacteria, particularly when the animal is subjected to unsanitary conditions for an extended duration.

It is therefore an object to provide healthy husbandry conditions for cattle by the use of a device of simplified design which will on the one hand retain bedding in a stall while at the same time permitting drainage through the device of any liquids in the stall, to the adjacent gutter for discharge.

It is also an object of the present invention to provide a device of simple yet rigid construction which allows liquids to flow therethrough.

The invention therefore achieves a bedding retainer with liquid drainage facility permitting fluids to pass therethrough to the gutter but constraining bedding material in the stall.

The invention contemplates a device for use in retaining bedding in an animal stall while permitting drainage of liquids from the stall, the stall having a floor bounded by a gutter, the device comprising a horizontally elongated upright portion, a flange integral with the upright portion and extending laterally therefrom, a skirt depending from the upright portion below the plane of the flange, the improvement comprising a passage defined by the upright portion disposed in close proximity to the flange to permit the flow of liquids by the upright portion.

Particularly the passage consists of orifices serially disposed at the interface of the flange and the upright member.

When the retainer device is preferably formed from a single sheet of rigid material, the upright portion of the device has an inverted U-shape in transverse crossection, the flange extending from one upright arm and the skirt extending from one upright arm the passage includes means disposed along the skirt to provide drainage from beneath the inverted U-shape upright portion as well.

The invention will now be described by way of example with reference to the accompanying drawings in which.

Figure 1:
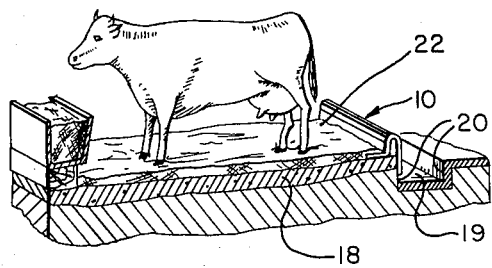
FIG. 1 is a perspective view of a bedding retainer, according to the embodiments of the invention, being fixed to the flooring of the barn.

The bedding retainer, shown in the drawings, is generally indicated by the numeral 10 and is constructed of rigid sheet material such as galvanized steel and consists of an upright portion 11 formed by bending the sheet into a U-shape with two downwardly depending arms 12 and 13 and an arched crown 14. The free end portion of the arm 12 is bent laterally at right angles to form an outwardly extending flange 15 perpendicular to the upright portion 11. The other arm 13 extends downwardly below the plane of the flange 15 to form a depending skirt 16 terminating in a horizontal edge 17.

The bedding retainer 10 is secured to the stall floor 18 adjacent to the gutter 19 and extends across the whole opening of the stall. It is secured to the gutter wall 20 by lag bolts 21 which extend through retaining orifices 22 disposed adjacent to the horizontal edge 17 in the depending skirt 16; the flange 15 is likewise secured to the stall floor 18 by lag bolts (not shown) or other fastening devies, extending through aperatures 23 disposed along the flange 15.

In order to provide drainage of liquids from the stall, so that the liquids may flow from the stall floor 18 through the bedding retainer 10 to the gutter 19 for discharge, a passage, as a series of drainage orifices 26, is provided near and preferably at the bend between the flange 15 and the arm 12 so as to intersect the same; a series of vertically disposed recesses or channels 27 may be provided, in the skirt portion, and depend from the plane of the flange. These latter depending channels 27 permit continual drainage of the liquids, which might accumulate in the region beneath the arched crown 14, into the gutter 19, and thus avoid "backup" of liquids back into the stall through the drainage orifices 26 which might occur if the secondary drainage channels 27 were not provided. In some applications, the channels 27 need not be provided since there will be enough clearance as a result of gutter wall surface irregularity to effectively permit drainage between skirt 16 and gutter wall 20.

The size, spacing and configuration of the orfices 26 may in certain applications be material. I have found that an oblong orfice of about 1¾ × 5/16 inches (4½ × ½ cm.) spaced 12 to 18 inches (30 to 45 cm.) apart are adequate to permit the liquids to drain from the stall, yet inhibit bedding and other material from clogging the orfices while not significantly reducing the rigidity of the device when made with the preferred rigid materials such as galvanized sheet steel of about ⅛ inch (0.3 cm.) thickness.

Figure 2:
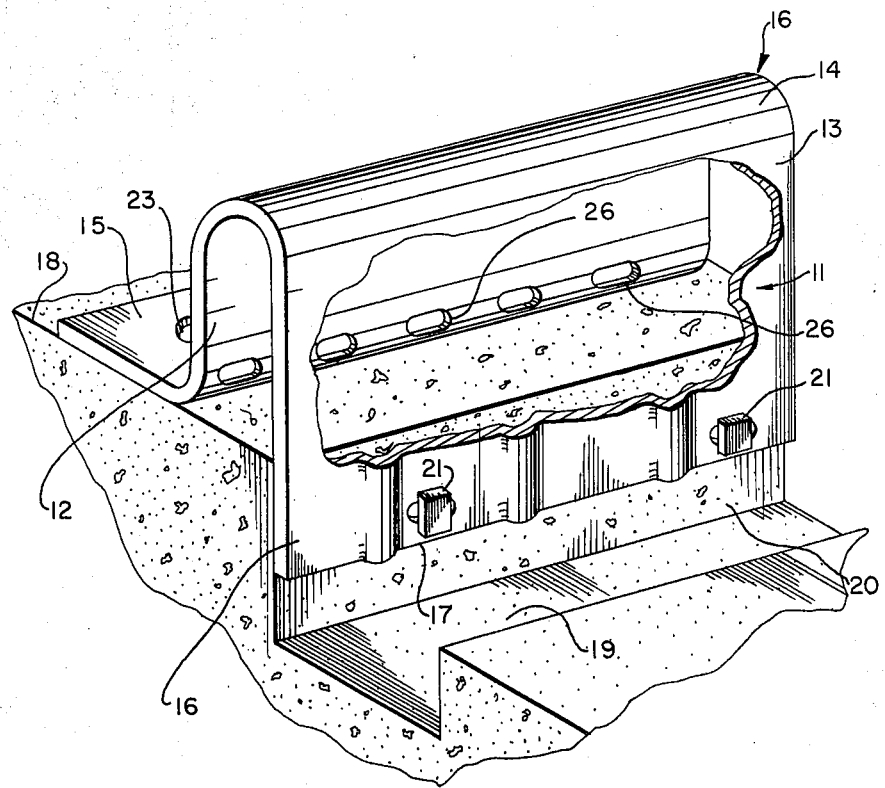
FIG. 2 is a fragmentary perspective view of one embodiment in its occupied place in the stall.
Figure 3:
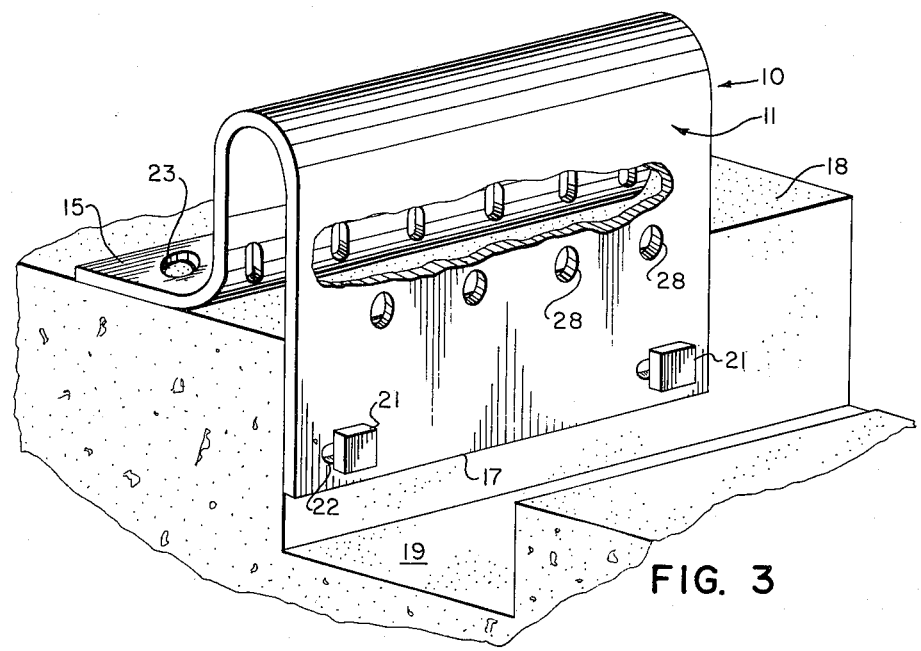
FIG. 3 is likewise a fragmentary perspective view of an alternative embodiment of the invention.

Referring to FIG. 3 the oblong drainage orfices 26 may be disposed vertically rather than horizontally as shown in FIG. 2. Each has advantage. The oblong slots in the vertical permit effective drainage of liquids when there is an excessive pooling in the stall and help to drain the top portions of the bedding as well as the lower portion; however, I have found that where continual drainage of only small amounts of liquids are required oblong slots in the horizontal as that of the embodiment of FIG. 2 are preferred because of the greater drainage area afforded at the flange-arm bend.

Figure 4:
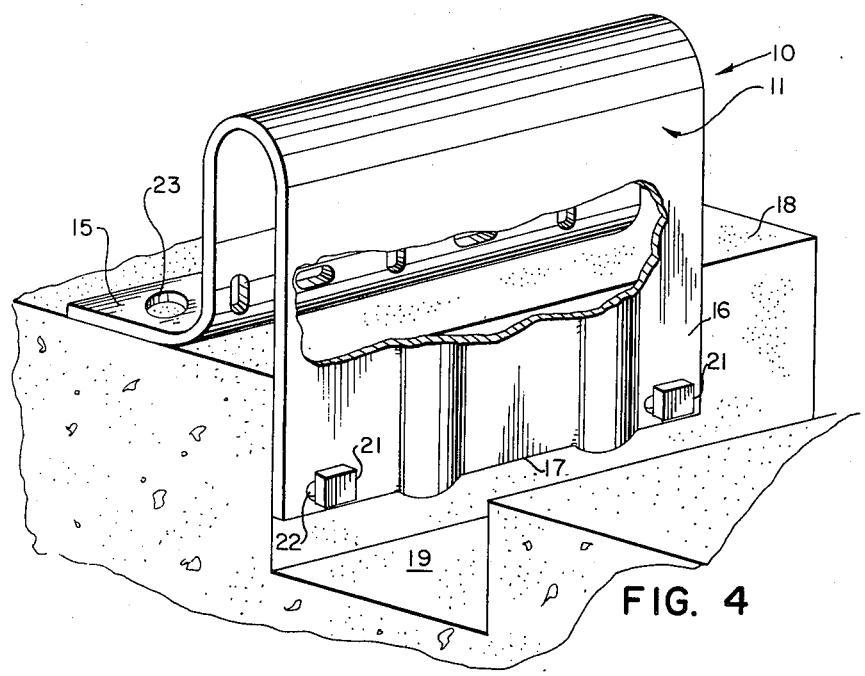
FIG. 4 is yet another alternative embodiment.

Referring to FIG. 4, in order to preserve the mechanical strength of the bedding retainer, while therefore affording maximum drainage cross-section along the whole extent and depth of the bedding, the oblong drainage orfices 26 are alternatively disposed in the vertical and horizontal along the flange-arm bend. Such arrangement of drainage orfices affords satisfactory drainage of liquids under most severe conditions while preserving the mechanical strength of the bedding retainer 10. In such embodiment the oblong orfices have the size previously described but are placed at 12 inch centers although 18 inch centers may be also satisfactory.

Referring to FIG. 3 of the vertical recesses 27 which affords secondary drainage from beneath the inverted U-shaped upright portion to the gutter, the same may be replaced with skirt orifices 28 disposed to intersect the projection of the plane of the flange preferably, so that the orifices extend slightly above and below the projection of the plane of the flange 15. This affords adequate drainage from beneath the arched crown 14 and inhibits pooling beneath the crown and hence backing up of these liquids into the stall from whence they came.

Figure 5:
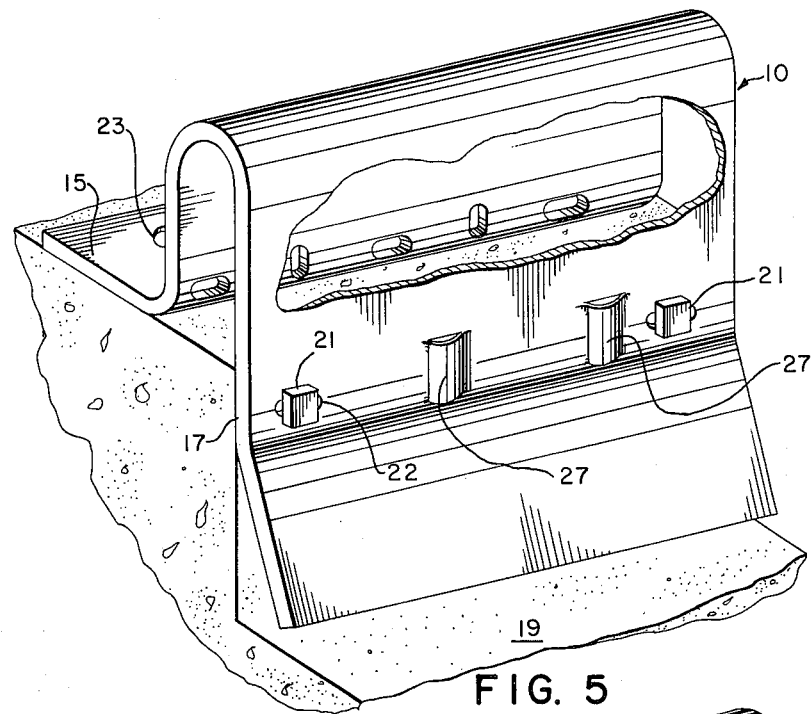
FIGS. 5 and 6 are alternative styles of bedding retainers employing embodiments of the invention.
Figure 6:
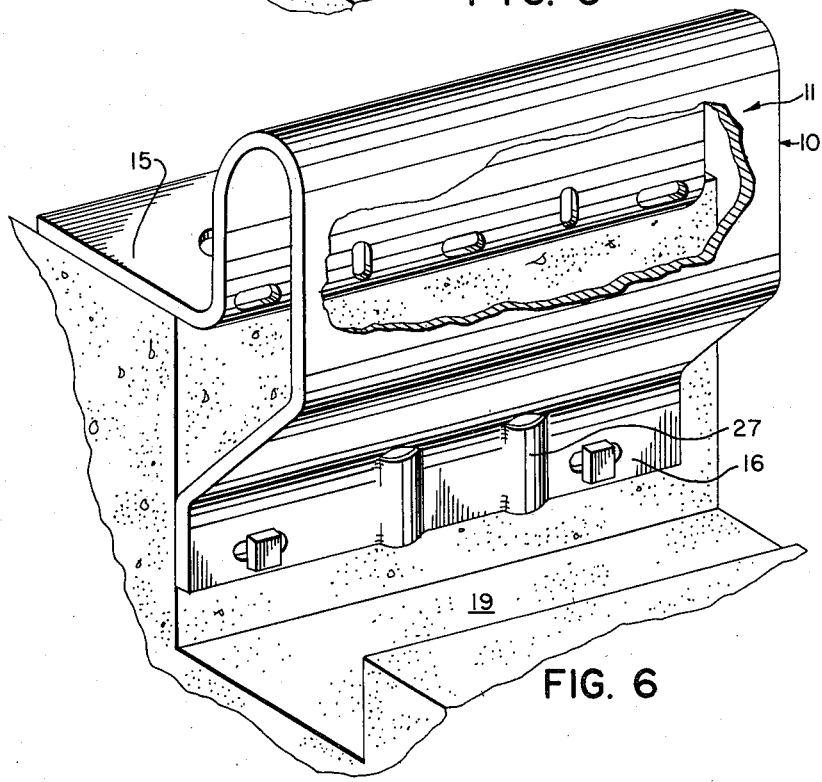

Referring to FIGS. 5 and 6, the drainage facility may also be provided in alternative designs of the bedding retainer, with equally effective results. It should be noted, that the size of the drainage orifices 28 or of the cross-sectional area of the channels 27 is not critical as each may be as small, in cross-sectional area, as one eighth inches square, as this area is normally sufficient to provide enough cross-sectional drainage area, from beneath the arched crown, to allow continual drainage of liquids from that region, when the channels are spaced, center to center, about 12 inches apart.

The retainer 10 may have the following suitable dimensions:

|  | Inches | Centimeters |
|---|---|---|
| Height of upright portion (11) | 3 | 7.5 |
| Width between arms (12-13) | 1 | 2.5 |
| Radius of crown (14) | ½ | 1.2 |
| Width of flange (15) | 4 | 10 |
| Width of shirt (16) | 1.5 | 4.7 |

The embodiments in which an exclusive property or privilege is claimed are defined as follows:

1. A device for use in retaining bedding in an animal stall while permitting drainage of liquids from the stall, the stall having a floor bounded by a gutter, the device comprising a horizontally elongated upright portion adapted to extend above the floor of the stall, a flange integral with the upright portion and extending laterally therefrom in the plane of the floor, a skirt depending from the upright portion that extends below the plane of the floor, the improvement comprising at least one passage extending through the upright portion to permit the flow of liquids to pass through the upright portion.

2. The device of claim 1, including a plurality of orifices extending through the upright member and disposed near the lateral flange.

3. The device of claim 2 in which spaced first and second parallel arms form said upright portion, said first arm being angulated laterally to provide said flange, said second arm extending downwardly to form said skirt, the passage including a plurality of orifices extending through the first arm and disposed near the lateral flange.

4. The device of claim 2, wherein the orifices intersect the plane of the flange.

5. The device of claim 2, wherein the orifices are oblong and intersect the plane of the flange.

6. The device of claim 2, wherein the orifices are oblong and adjacent orifices are alternately disposed to intersect the plane of the flange.

7. The device of claim 3, wherein the skirt defines vertical channels which communicate with the region between the parallel arms and hence provide a flow course for the fluid passing through the orifices in said first arm into said region to pass downwardly through said channels into the gutter.

8. The device of claim 3, wherein a second set of a plurality of orifices extends through the second parallel arm to thereby provide a flow course for the fluid passing through the orifices in both arms to pass into the gutter.

* * * * *